United States Patent
Childress et al.

(10) Patent No.: US 11,631,416 B1
(45) Date of Patent: Apr. 18, 2023

(54) AUDIO CONTENT VALIDATION VIA EMBEDDED INAUDIBLE SOUND SIGNAL

(71) Applicant: Kyndryl, Inc., New York, NY (US)

(72) Inventors: Rhonda L. Childress, Austin, TX (US); Michael Bender, Rye Brook, NY (US); Jeremy R. Fox, Georgetown, TX (US); Yinghui Zeng, Columbia, MO (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/546,100

(22) Filed: Dec. 9, 2021

(51) Int. Cl.
*G10L 19/018* (2013.01)
*G10L 25/51* (2013.01)

(52) U.S. Cl.
CPC ............ *G10L 19/018* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 8,001,561 B2 | 8/2011 | Gibbs et al. | |
| 8,549,550 B2 | 10/2013 | Lopatecki et al. | |
| 8,655,826 B1 | 2/2014 | Drewry et al. | |
| 9,251,406 B2 | 2/2016 | Lempel et al. | |
| 9,305,559 B2 | 4/2016 | Sharma et al. | |
| 9,665,169 B1 | 5/2017 | Dai et al. | |
| 10,044,448 B2* | 8/2018 | Mufti | H04N 21/4394 |
| 10,075,767 B2 | 9/2018 | Husain et al. | |
| 10,080,137 B2* | 9/2018 | Rolls, IV | H04L 63/08 |
| 10,169,985 B1* | 1/2019 | Rader | G08C 23/02 |
| 10,236,006 B1 | 3/2019 | Gurijala et al. | |
| 10,292,375 B1 | 5/2019 | Loganathan et al. | |
| 10,460,709 B2 | 10/2019 | Bradley et al. | |
| 2010/0208631 A1 | 8/2010 | Zhang et al. | |
| 2015/0113094 A1* | 4/2015 | Williams | H04L 67/02 709/217 |
| 2015/0206446 A1 | 7/2015 | Gupta et al. | |
| 2019/0173590 A1* | 6/2019 | Mufti | H04N 21/4622 |

(Continued)

FOREIGN PATENT DOCUMENTS

JP 2010243662 A 10/2010

OTHER PUBLICATIONS

IBM Publication, "z/Architecture Principles of Operation," IBM® Publication No. SA22-7832-12, 13th Edition, Sep. 2019 (pp. 1-2000).

(Continued)

*Primary Examiner* — Paul W Huber
(74) *Attorney, Agent, or Firm* — Dan Housley, Esq.; Kevin P. Radigan, Esq.; Heslin Rothenberg Farley & Mesiti P.C.

(57) ABSTRACT

Data-analysis-based processing is provided to validate audio content delivery via embedded inaudible sound signals. The processing obtains, by a validation system, an indication of detection of an inaudible sound signal embedded in an audio output of provided content initiated by a user on a user-device. The inaudible sound signal is inaudible to the user, and the audio output is from the user-device. Based on obtaining the indication of detection of the inaudible sound signal embedded in the audio output, the validation system validates that the audio output of the provided content is ON with respect to the user-device.

14 Claims, 14 Drawing Sheets

(56) References Cited

U.S. PATENT DOCUMENTS

2022/0342537 A1* 10/2022 Sharifi .................. G06F 3/165

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
Roy, Nirupam, "Inaudible Acoustics: Techniques and Applications", Disertation, University of Illinois at Urbana-Champaign, 156 pages (Year: 2018).

* cited by examiner

US 11,631,416 B1

AUDIO CONTENT VALIDATION VIA EMBEDDED INAUDIBLE SOUND SIGNAL

BACKGROUND

Ensuring that a user is listening to provided audio content is required in many different types of content delivery workflow paths. For instance, distance learning has experienced tremendous growth in popularity in recent years. Many institutions and companies are offering online courses and training, as well as certifying employees and contractors who work in various environments via online presentations.

In one approach, a content provider can deliver requested content to a user's device, and provide the user with a short list of questions near the end of the provided content to verify delivery of the content. This can be adequate for the tested material, but the user might still have missed one or more portions of the provided content, which could conceivably have consequences depending on the provided content. For instance, where the content is safety training material, it could potentially become a liability issue for a company employing the user.

SUMMARY

Certain shortcomings of the prior art are overcome and additional advantages are provided through the provision, in one or more aspects, of a computer program product for facilitating validation of audio content delivery. The computer program product includes one or more computer-readable storage media having program instructions embodied therewith. The program instructions are readable by a processing circuit to cause the processing circuit to perform a method which includes obtaining an indication of detection of an inaudible sound signal embedded in an audio output of provided content initiated by a user on a user-device, the inaudible sound signal is inaudible to the user, and the audio output is from the user-device. Further, the method includes, based on obtaining the indication of detection of the inaudible sound signal embedded in the audio output, validating that the audio output of the provided content is ON with respect to the user-device.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The accompanying figures, which are incorporated in and form a part of this specification, further illustrate the present invention and, together with the detailed description of the invention, serve to explain aspects of the present invention. Note in this regard that descriptions of well-known systems, devices, techniques for generating inaudible acoustics, processing techniques, etc., are omitted so as to not unnecessarily obscure the invention in detail. Further, it should be understood that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 6:
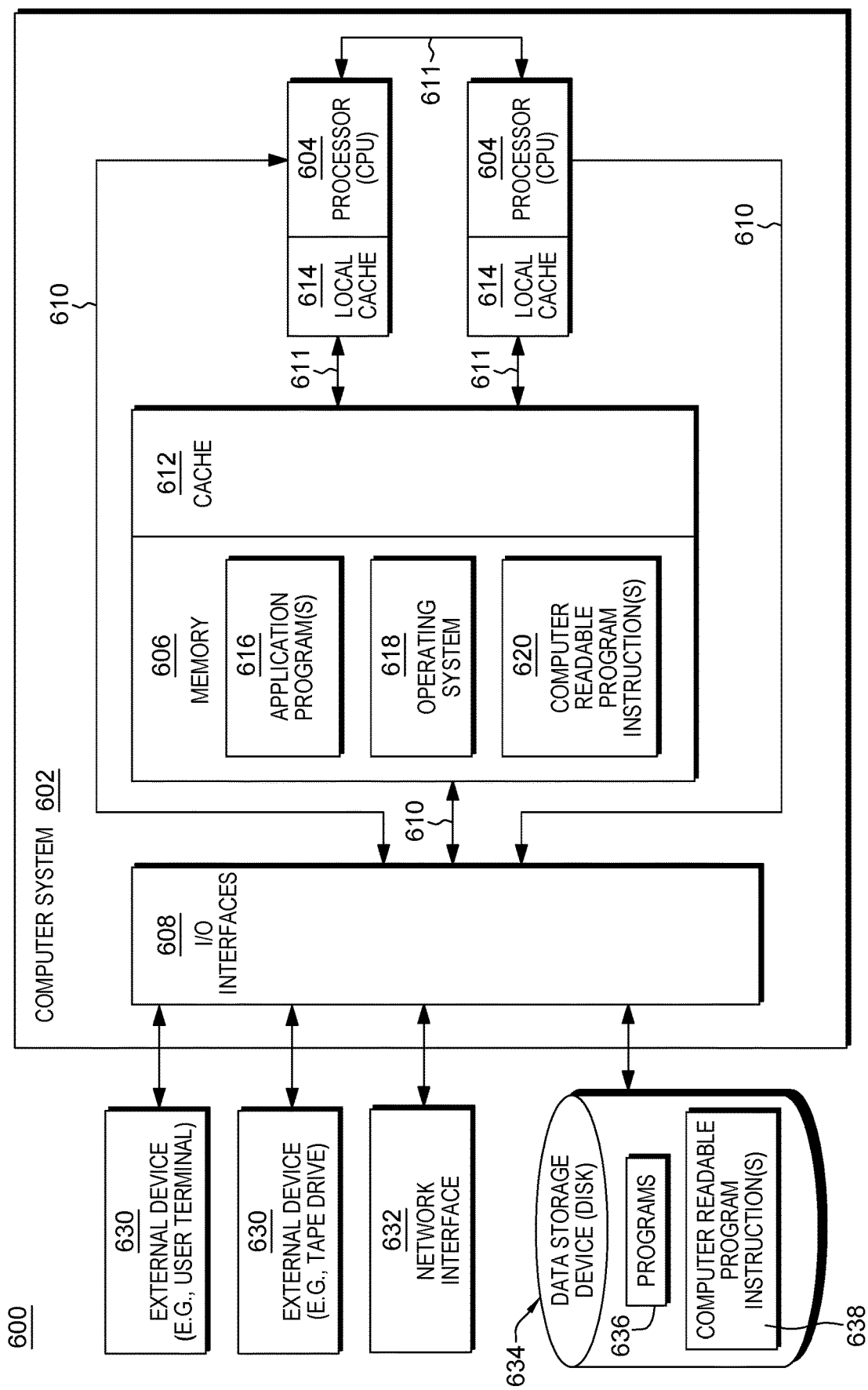
FIG. 6 depicts a further example of a computing environment to incorporate and use one or more aspects of the present invention.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, can reside on hard disk drive 226 and in main memory 208 of computing environment 200 of FIG. 2. Another example of program code is depicted in FIG. 6 as one or more of application program(s) 616, and computer-readable program instruction(s) 620, stored in memory 606 of computing environment 600, as well as programs 636 and computer-readable program instruction(s) 638, stored in a data storage device 634 accessed by, or within, computing environment 600.

As noted initially, ensuring that a user is listening to provided audio content is required in many different types of content delivery workflow paths. For instance, many institutions and companies are offering online courses and training, as well as certifying employees and contractors who work in various environments via online presentations. In each case, verifying delivery of audio content is desirable to confirm user engagement with the provided content.

In one approach, a user can be provided with a short list of questions near the end of the provided content to verify delivery of the content. This can be adequate for the tested material, but the user might still have missed one or more portions of the provided content, which can have undesirable consequences depending on the content.

Figure 1:
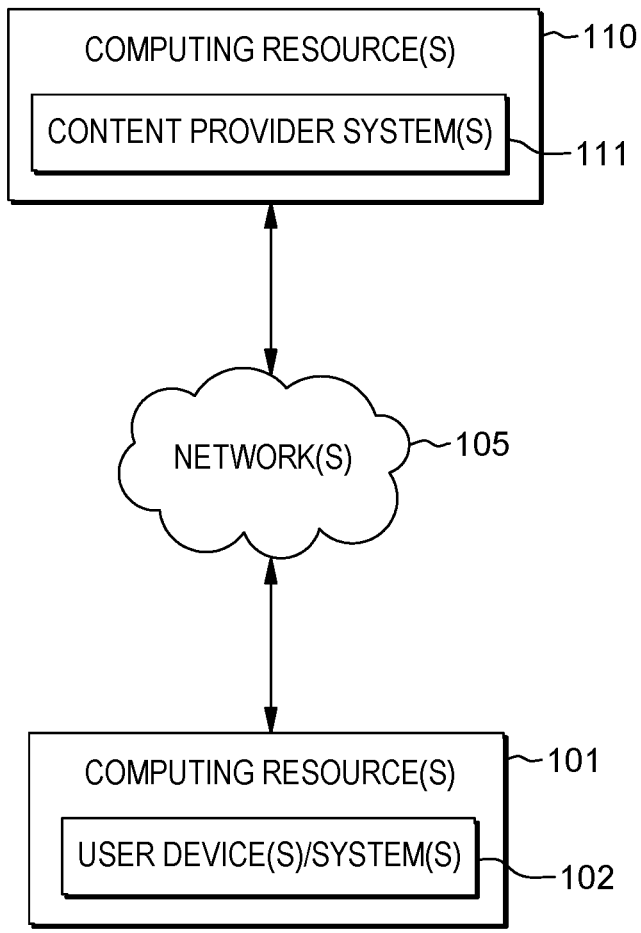
FIG. 1 depicts one embodiment of a computing environment to incorporate and use one or more aspects of the present invention.

By way of example, FIG. 1 depicts one embodiment of a computing environment 100 which includes one or more computing resources 101 in communication across one or more networks 105 with one or more other computing resources 110. As one example, computing resource(s) 101 is, or includes, one or more user-devices 102, and computing resource(s) 110 is, or includes, one or more content provider systems 111, such as one or more web content provider systems accessed by user-device(s) 102 across network(s) 105. In one embodiment, user-device(s) 102 communicates with content provider system(s) 111 to access provided content, such as audio content and/or multimedia content, across the one or more networks 105. By way of example, network(s) 105 can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including data packets. In one or more embodiments, the data includes provided content with embedded inaudible sound signals for verifying that the audio output of the provided content is ON with respect to the user's device, in accordance with one or more aspects disclosed herein. Note that an inaudible sound signal, as used herein, refers to a sound signal outside the hearing range of a user. For instance, in one example, the inaudible sound signal can be an ultrasonic sound signal.

Figure 2:
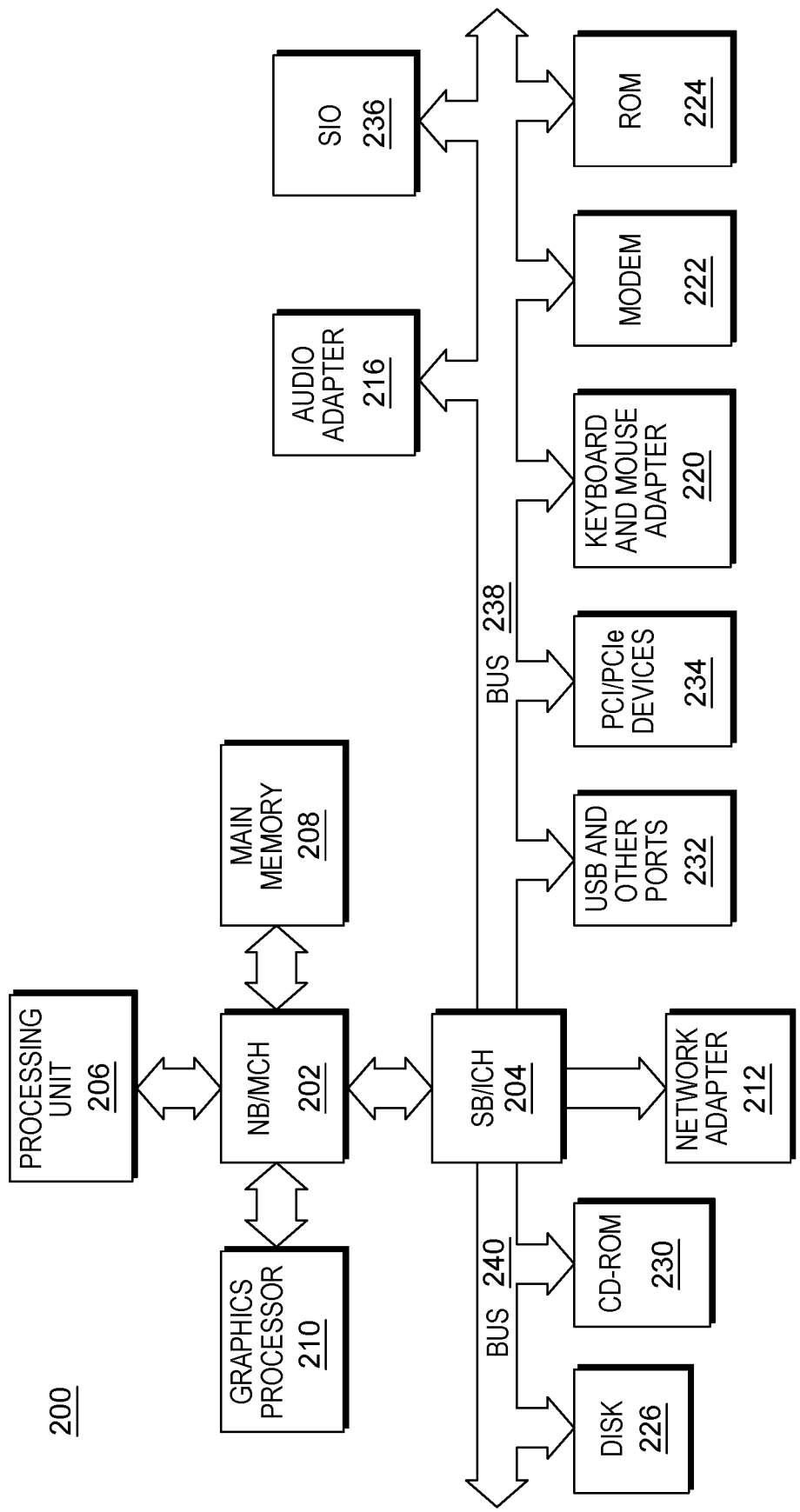
FIG. 2 depicts a further example of a computing environment to incorporate and use one or more aspects of the present invention.

Referring to FIG. 2, a block diagram of a computing environment, or data processing system 200, in which illustrative embodiments can be implemented is shown by way of further example. Data processing system 200 is an example of a computer, such as computer resource(s) 101, and/or computer resource(s) 110 in FIG. 1, or another type of device in which computer-usable program code or instructions implementing processes such as disclosed herein can be located, in one or more embodiments.

In the depicted example, data processing system 200 includes a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 can contain one or more processors and even can be implemented using one or more heterogeneous processor systems. Graphics processor 210 can be coupled to the NB/MCH through an accelerated graphics port (AGP), for example.

In the depicted example, a local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to south bridge and I/O controller hub 204.

An operating system runs on processing unit 206 and coordinates and provides control of various components within data processing system 200 in FIG. 2. The operating system can be a commercially available operating system. An object oriented programming system can run in conjunction with the operating system and provide calls to the operating system from programs or applications executing on data processing system 200.

Instructions for the operating system, the object-oriented programming system, and applications or programs can be located on storage devices, such as hard disk drive 226, and can be loaded into main memory 208 for execution by processing unit 206. The processes of the illustrative aspects discussed herein can be performed by processing unit 206 using computer implemented instructions, which can be located in a memory such as, for example, main memory 208, read only memory 224, or in one or more peripheral devices.

Note that the hardware embodiment depicted in FIG. 2 can vary depending on the desired implementation. Other internal hardware or peripheral devices, such as one or more speakers, microphones, flash memory, equivalent non-volatile memory, or optical disk drives and the like, can be used in addition to or in place of certain hardware depicted. Also, the processes of the illustrative aspects described herein can be applied to other hardware environments, such as to a multiprocessor data processing system.

In one or more implementations, data processing system 200 can be an electronic device or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 208 or a cache such as found in north bridge and memory controller hub 202. A processing unit can include one or more processors or CPUs. Those skilled in the art should note that the depicted system example of FIG. 2, as well as other examples referenced herein, are not meant to imply architectural limitations. As noted, data processing system 200 can be implemented as part of computer resource(s) 101 and/or computer resource(s) 110 in FIG. 1, such as a part of a smartphone, tablet computer, laptop computer, desktop computer, server, personal digital assistant (PDA), wireless computer, server, mainframe system, etc.

As noted, the illustrated hardware of FIGS. 1-2 can vary depending on the implementation. Other internal hardware or peripheral devices, such as flash memory, equivalent non-volatile memory, or optical disk drives and the like, can be used in addition to or in place of the hardware depicted in FIGS. 1-2. In addition, one or more processes of the illustrative embodiments can be applied to a multiprocessor data processing system.

In one or more implementations, a computer program product, computer system and computer-implemented method are provided herein for facilitating validation of delivery of audible audio output of provided content initiated by a user on a user's device. In one or more implementations, inaudible sound signals are injected into the provided content to provide a mechanism for data-analysis of detected audio output to verify that the audio output of the provided content is ON with respect to the user-device. The inaudible sound signals are inaudible to the user of the user-device.

More particularly, in one or more embodiments, disclosed herein are a computer program product, computer system and computer-implemented method which include program code executing on one or more processors that obtains an indication of detection of an inaudible sound signal embedded in an audio output of provided content initiated by a user on a user-device. The inaudible sound signal is inaudible to the user, and the audio output is from the user-device. Further, the program code validates, based on obtaining the indication of detection of the inaudible sound signal embedded in the audio output, that the audio output of the provided content is ON with respect to the user-device.

In one or more embodiments, the program code obtains microphone audio data representative of the audio output of provided content on the user-device, and the validating includes comparing the microphone audio data to the provided content to verify that the inaudible sound signals embedded therein match. The inaudible sound signals matching is indicative that the audio output of the provided content is ON with respect to the user-device.

In one example, the validating is by a validation system, and the program code further facilitates linking the validation system to a content provider system supplying the provided content to the user-device, and providing, by the validation system, analysis data to the content provider system resulting from the comparing of the microphone audio data to the provided content.

In one or more embodiments, based on the embedded inaudible sound signals not matching during the comparing of the microphone audio data and the provided content, the program code further identifies one or more portions of the provided content where the audio output of the provided content was unable to be heard through the user-device. In one embodiment, the program code further initiates, based on the identifying of the one or more portions, modifying of the provided content to obtain modified content for providing to the user-device. In one example, the modified content includes the one or more portions of the provided content where the audio output of the provided content was unable to be heard through the user-device.

In one example, the program code further determines whether the detected inaudible sound signal embedded in the audio output has reached a specified threshold, wherein the validating is further based on the inaudible sound signal embedded in the audio output of the provided content reaching the specified threshold.

In one example, the validating is by a validation system, and the program code obtains an indication of registration of the user-device with the validation system, where the user-device includes a microphone for detecting, in part, the inaudible sound signal embedded in the audio output of the provided content when the audio output is ON with respect to the user-device. In another embodiment, the program code obtains an indication of registration of another user-associated device with the validation system, where the other user-associated device includes a microphone for detecting, in part, the inaudible sound signal embedded in the audio output of the provided content when the audio output is ON with respect to the user-device.

Embodiments of the present invention are inextricably tied to computing and provide significantly more than existing approaches to validating audio content delivery. For instance, embodiments of the present invention provide program code executing on one or more processors to exploit the interconnectivity of various systems, as well as to utilize various computing-centric data analysis and handling techniques, in order to ascertain whether the audio output of the provided content is ON with respect to a user-device. Both the interconnectivity of devices and computing systems utilized, and the computer-exclusive data processing techniques utilized by the program code, enable various aspects of the present invention. Further, embodiments of the present invention provide significantly more functionality than existing approaches to validating audio content delivery to a user-device.

In embodiments of the present invention, program code executing on one or more processors provides significantly more functionality, including but not limited to: 1) program code that obtains an indication of detection of an inaudible sound signal embedded in an audio output of provided content initiated by a user on a user-device, where the inaudible sound signal is inaudible to the user, and the audio output is from the user-device; and 2) program code that validates, based on obtaining the indication of detection of the inaudible sound signal embedded in the audio output, that the audio output of the provided content is ON with respect to the user-device.

Advantageously, the program product, system and method disclosed herein improve processing with a computing environment by facilitating validation of audio content delivery to a user-device. In one or more embodiments, inaudible sound signals are injected into content being remotely accessed by a user on a user-device as an indication of whether the audio output of the provided content is ON with respect to the user-device. Should validation not occur, then workflow delivery of the content can be modified, for instance, to pause or to replay one or more portions of the provided content where the audio output was not ON with respect to the user-device. Further, in one or more embodiments, the content can be modified to replay one or more portions of the content identified as mandatory or of greater importance within the content, based on the same or different one or more portions of the audio output not being validated on the user-device.

Figure 3:
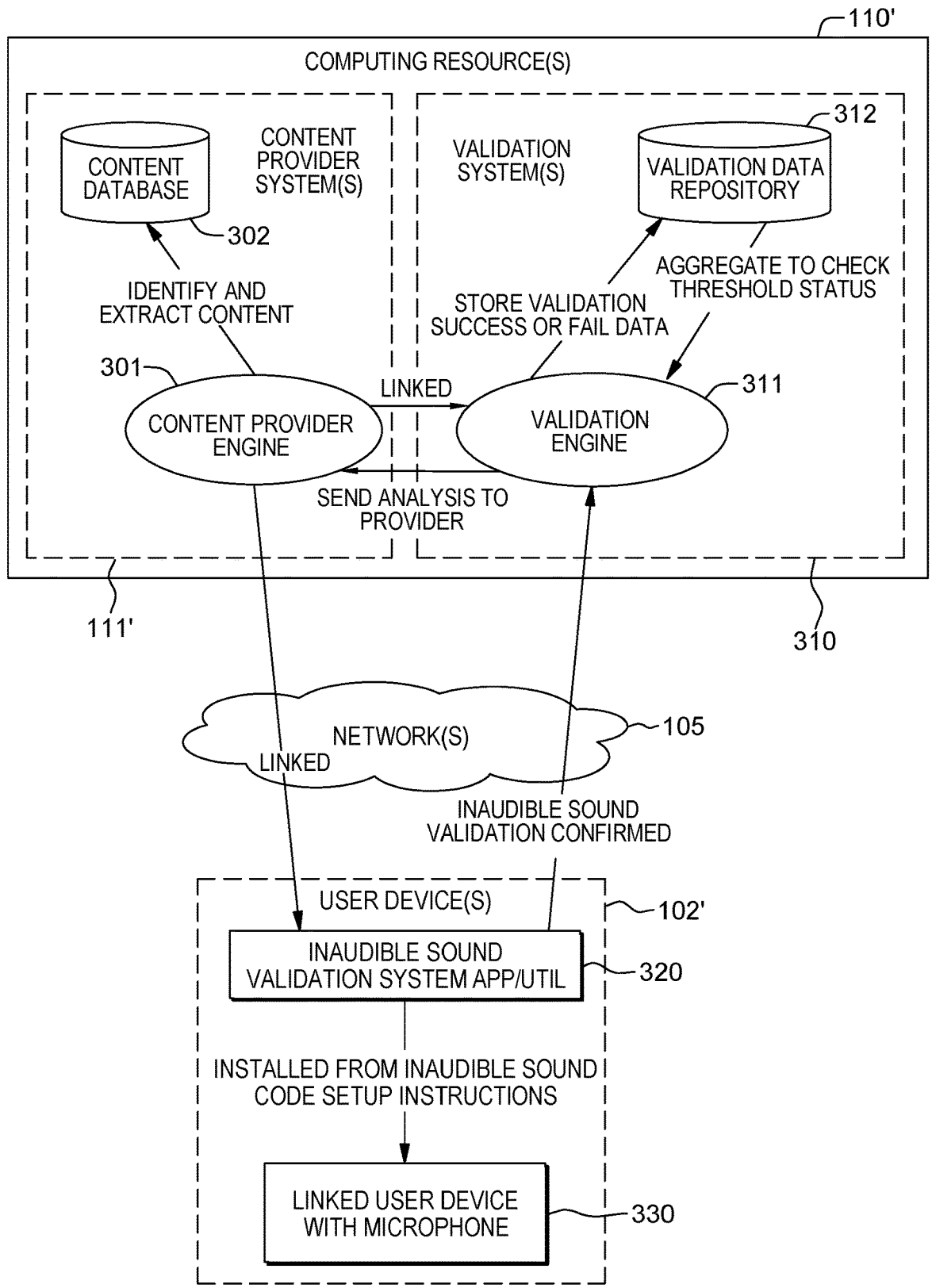
FIG. 3 illustrates another example of a computing environment to incorporate and use one or more aspects of the present invention.

FIG. 3 depicts a further embodiment of a computing environment 300 and workflow, in accordance with one or more aspects of the present invention. Computing environment 300 is similar, at least in part, to computing environment 100 described above in connection with FIGS. 1 & 2. Within computing environment 300, one or more user-device(s) 102' are in communication across one or more networks 105 with one or more computing resources 110'. As one example, computing resource(s) 110' is, or includes, one or more content provider systems 111', such as one or more web content provider systems accessed by user-device(s) 102' across network(s) 105. Additionally, within computing environment 300, a validation system 310 is provided. In the illustrated embodiment, validation system 310 resides on, or is part of, computing resource(s) 110'. In one or more other embodiments, validation system(s) 310 can be separate from computing resource(s) 110' housing content provider system(s) 111'.

In the embodiment illustrated, content provider system(s) 111' includes a content provider engine 301 which accesses a content database 302 to identify and extract content to be provided to user-device 102'. Note further that user-device(s) 102' can be any of a variety of devices, such as a smartphone, a tablet computer, a laptop computer, a desktop computer, a server, a personal digital assistance (PDA), a wireless computer, etc.

In one or more embodiments, the depicted workflow includes linking or registering one or more user-devices 102' with the content provider system(s) 111', and/or validation system(s) 310. This linking or registering can make the processing disclosed herein subject to consent of the user to such activity, for instance, through "opt-in" or "opt-out" processes, as may be appropriate for the situation and type of information. Note also that to the extent implementation of the present invention collects, stores, or employs personal information provided by, or obtained from, individual users (for instance, current usage data of devices, location of devices, etc.), such information shall be used in accordance with all applicable laws concerning protection of personal information. Storage and use of personal information may be of any appropriate secure manner reflective of the type of information, for example, through various encryption and/or anonymization techniques. In one or more embodiments, anonymization processing can be employed (in part) to ensure that little personal information is used by the validation system. Note further that, in one or more implementations, the validation system(s) 310 discussed herein can be part of the content provider system(s) 111' or can execute separate from the content provider system(s) in, for instance, a cloud-based implementation thereof.

In one or more embodiments, user-device(s) 102' is provided with, for instance, an application or utility 320, which in one embodiment can be downloaded from content provider system 111' and/or validation system 310, with the application utility being an inaudible sound validation system application or utility that can, in one embodiment, communicate with another user-associated device (or IoT device) that includes a supplemental microphone near, or linked to, the user 330. Note that the supplemental microphone can alternatively be part of the user-device having the inaudible sound validation system application or utility 320. Where they are separate devices then, in one embodiment, the supplemental device with the microphone linked to the user can be linked to the user-device via, for instance, an inaudible sound code setup instruction(s) received from, or via, the inaudible sound validation system application or utility 320.

In operation, content provider engine 301 identifies and extracts content for providing to user-device 102' from content database 302 associated with, or accessed by, content provider system(s) 111'. Along with the provided content, an inaudible sound signal is generated and embedded in the provided content for detection, such as described herein. Microphone audio data is obtained by user-device(s) 102' and/or the linked user-device 330, and compared to the provided content, for instance, by the inaudible sound validation system application or utility 320, to determine whether there is a match. In one embodiment, the inaudible sound signals matching is indicative that the audio output of the provided content is ON with respect to the user-device. Once matched, inaudible sound validation confirmation is sent (in one embodiment) to validation engine 311 of validation system(s) 310. Validation success or fail data can be stored to a validation data repository 312, and aggregated to check against a threshold status to determine whether a specified threshold has been reached, where validating the inaudible sound signal is further based on the inaudible sound signal embedded in the audio output of the provided content reaching the specified threshold. Validation engine 311 is linked, in one or more embodiments, to content provider engine 301, for instance, across one or more networks 105, and in one embodiment, validation engine 311 sends analysis-data to content provider engine 301 to initiate one or more actions based on the validation processing. For instance, in one or more embodiments, the action can be to award or deny credit to the user based on whether the audio output of the provided content is ON with respect to the user-device during the full content, or can be to pause the provided content, or to modify the provided content and provide the modified content to the user-device, for instance, to replay one or more portions of the provided content for the user, such as discussed herein.

Figure 4:
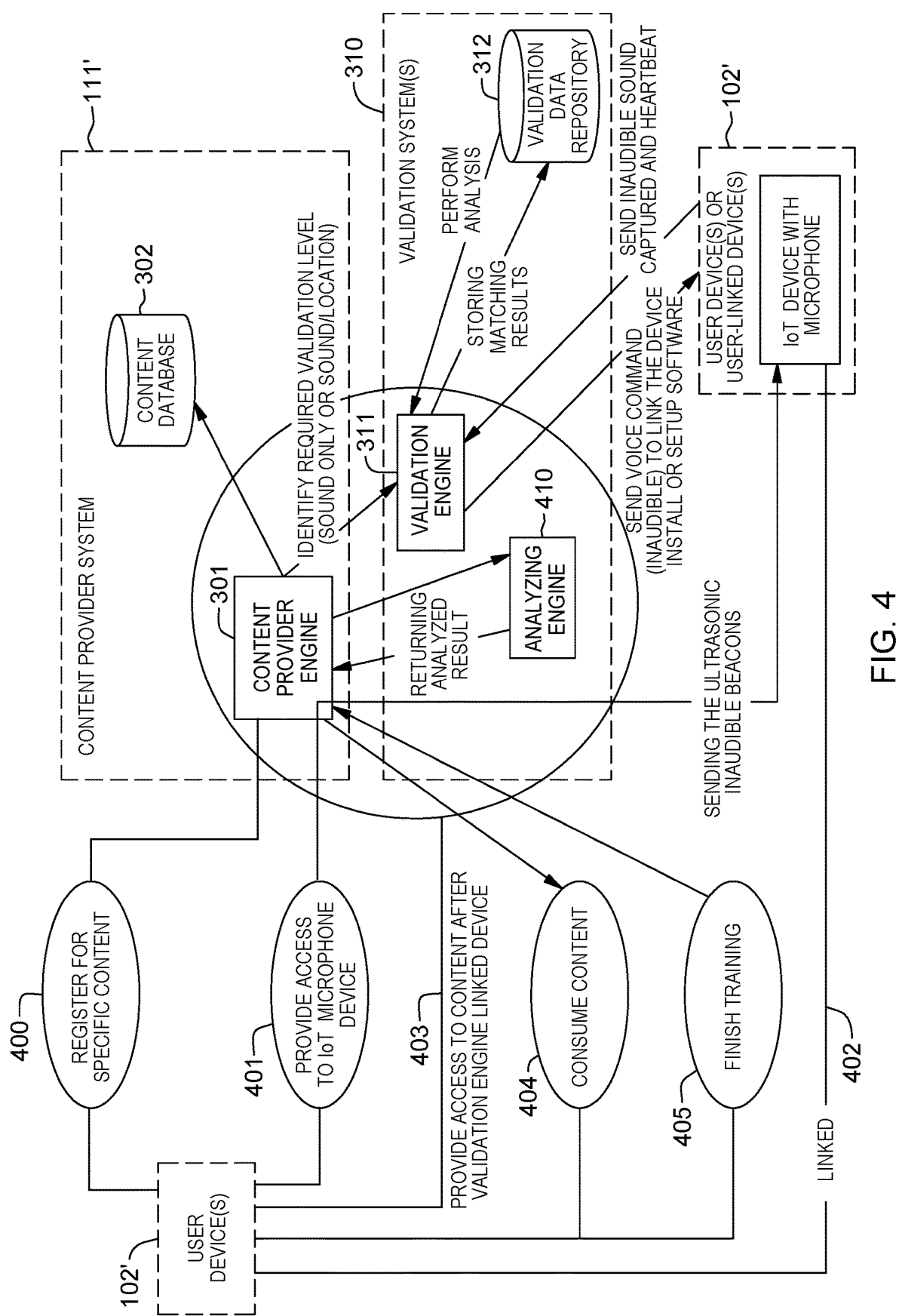
FIG. 4 illustrates a further embodiment of a computing environment to incorporate and use one or more aspects of the present invention.

By way of further example, FIG. 4 depicts an additional embodiment of a computing environment and workflow, in accordance with one or more aspects of the present invention. Computing environment 400 is similar, at least in part, to computing environment 100 described above in connection with FIGS. 1 & 2, as well as computing environment 300 described with reference to FIG. 3. Within the computing environment, one or more user-devices 102' are in communication across one or more networks with one or more computing resources which host, in one embodiment, one or more content provider systems 111', as well as one or more validation systems 310. As in the embodiment of FIG. 3, content provider system 111' includes a content provider engine 301 which accesses and extracts content from one or more content databases 302. In addition, validation system(s) 310 includes validation engine 311, which accesses validation data repository 312 to store results of comparing microphone audio data and the provided content, and which can extract aggregated data from the repository for performing analysis. An analyzing engine 410 can also be part of validation engine 311, or separately implemented, as in FIG. 4. In one embodiment, analyzing engine 410 returns an analyzed result to content provider engine 301 to facilitate the content provider engine taking an action, such as described herein. In the embodiment depicted, a separate IoT device with microphone is part of the user-device(s), or is a device linked to or associated with the user for, for instance, obtaining microphone audio data for comparison against the embedded inaudible sound signal within the provided content.

In operation, a user registers, via the user-device 102', with content provider system 111' for specific content 400. Further, the user provides access to either the user-device microphone, or an IoT microphone device associated with the user 401. In the example of FIG. 4, two user-devices are linked 402, with the secondary device having a microphone to pick up the audio output of the primary user-device. For instance, the user-device playing the provided content can be a laptop device, and the linked device can be, in one embodiment, the user's smartphone, which has a microphone that is capturing the audio output from the laptop. In one embodiment, a command (inaudible) is sent to link the device(s), or install or setup software to the IoT device(s) linked to the user, and in response, the inaudible sound signal is able to be captured in the audio output. In one embodiment, the inaudible sound signal can be an inaudible heartbeat sound. In the embodiment of FIG. 4, the captured microphone audio data is sent back to validation engine 311 commensurate with providing the user with the content 403. The user consumes the content 404, during which time, the inaudible sound signal embedded in the provided content is detected by the linked device and returned in the microphone output data to the validation engine. Once the content is complete, training is finished 405. Validation engine 311 stores any matching results in validation data repository 312, which facilitates the validation system performing analysis, such as described herein. In one embodiment, the content provider engine 301 provides validation engine 311 with the validation level required for the particular content and/or user. In one implementation, sound-only validation is required, while in another embodiment, both sound validation and device location validation may be required, where location validation includes validating that the linked IoT device is in closed proximity to the user-device playing the provided content. Depending on the results of the validation, the analyzing engine 410 can return analyzed results to content provider engine 301, to, for instance, initiate an action based thereon, such as described herein.

The inaudible sound validation processing disclosed herein can be used in a variety of implementations. For instance, in one example, the user may be required to listen to ongoing education content for different areas of the user's business. The user interface listens to the content that the user should be listening to, and if (for instance) the user's device sound is muted, or too low to be heard, then no credit is provided for the content. Note also that the inaudible sound signal can be generated for inclusion in the provided content based, in one embodiment, on the significance of the provided content. For instance, where the content relates to, for instance, a security issue, the inaudible sound signal can be generated once every few seconds to ensure that no part of the provided content is skipped. In comparison, where the content relates to a less important issue, then the inaudible sound signal can be generated once every minute or two, to allow for the verification processing disclosed herein. Further, the user's device, or linked user-device, can provide feedback data for user-authentication purposes that cross-verifies that the person listening to the provided content is indeed the intended user. In certain embodiments, one or more weighting factors can be attached to provided content to differentiate critical content from less-important content, if desired. Further, as described herein, pairing of a user-device, such as an IoT-wearable device with a microphone, can be used to facilitate validation of the audible content feed.

As discussed, results of the validation processing can be used as a workflow triggering mechanism to initiate an action concerning the provided content. For instance, where the validation system detects that the audio output of the provided content is insufficient to be heard through the user-device, then an action can be initiated to pause the content play, or to modify the provided content to, for instance, replay one or more portions of the provided content where the audio output was unable to be heard through the user-device. In this manner, the content-providing can be manipulated, based on the inaudible sound signal feedback.

FIGS. 5A-5F depict a more detailed embodiment of a workflow illustrating certain aspects of one or more embodiments of the present invention.

Figure 5A:
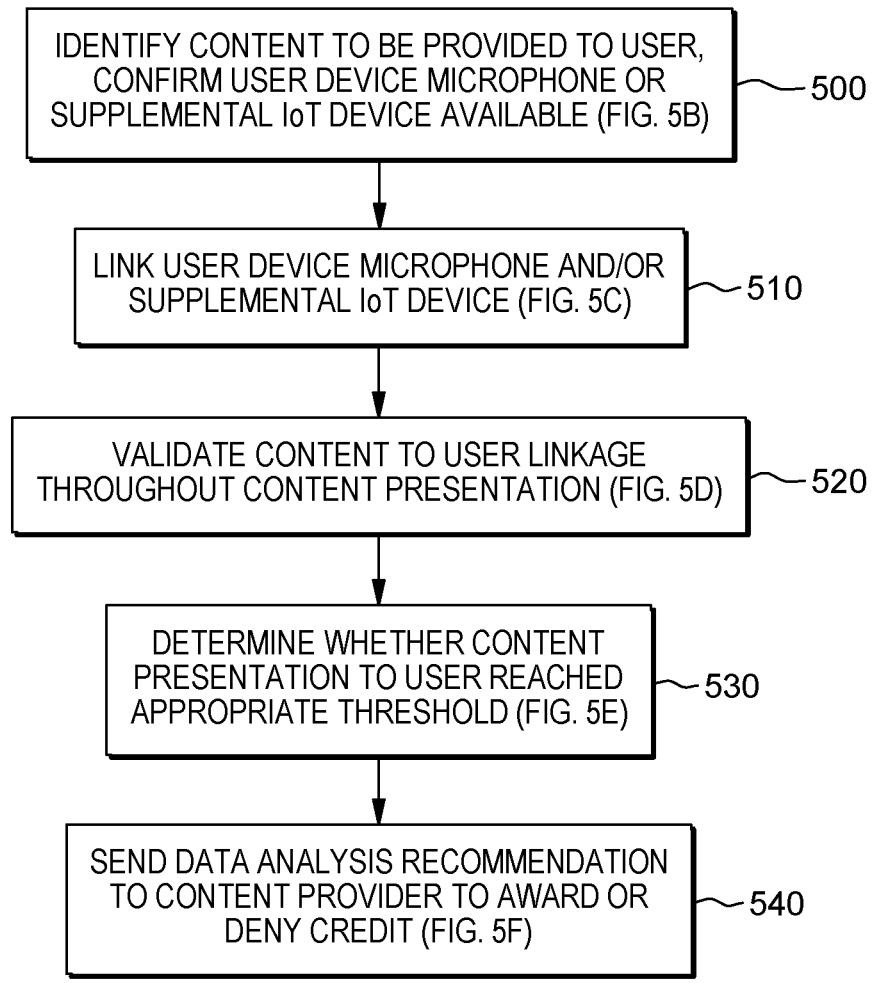
FIGS. 5A-5F depict a workflow illustrating certain aspects of one or more embodiments of the present invention.
Figure 5B:
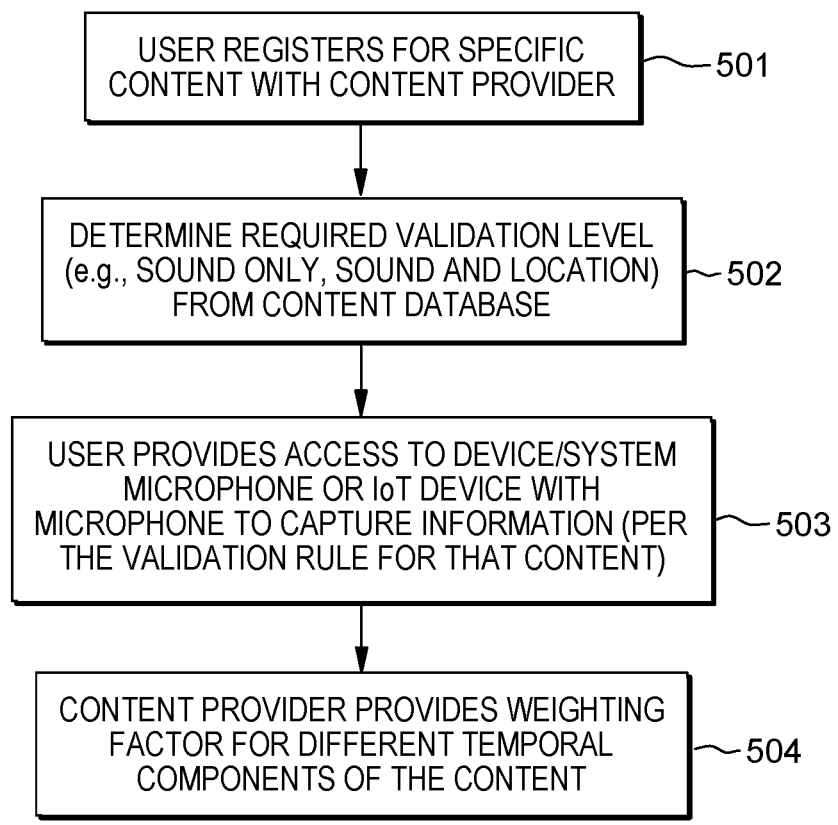

Referring to FIG. 5A, the depicted workflow example includes identifying content to be provided to a user, and confirming the user's device microphone or supplemental IoT device is available (if necessary) 500. One embodiment of such a process is depicted in FIG. 5B, where the user registers for specific content with a content provider 501. The content provider determines the required validation level (e.g., sound-only, sound and user-location verification, etc.) from the content database 502. The user provides access to the user's device/system microphone or to an IoT device linked to the user with a microphone to capture the needed information (for the validation rule for that content) 503. The content provider provides, in one embodiment, one or more weighting factors for different temporal components of the content 504. In one embodiment, different weighting factors can be used for different portions of the provided content with, in one embodiment, the inaudible sound signal being differently tailored for different portions of the content based on the different weighting factors. In another embodiment, the different weighting factors can be used in association with content manipulation, based on whether the audio output of the provided content is ON or OFF with respect to the user-device.

Figure 5C:
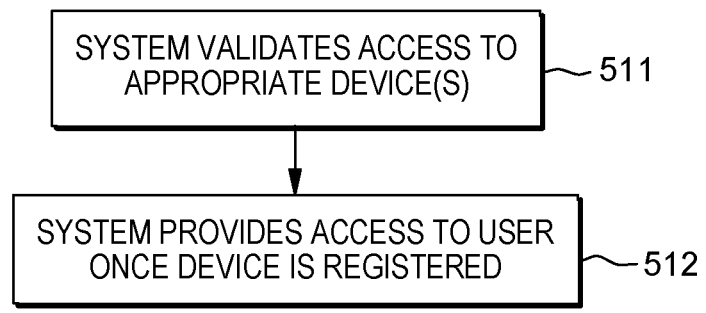

As depicted in FIG. 5A, the workflow links the user-device microphone and/or supplemental IoT device to the validation system 510. One embodiment of this is depicted in FIG. 5C. As illustrated, the system validates access to the appropriate device(s) 511, and provides access to the user once the user's device(s) is registered 512.

Figure 5D:
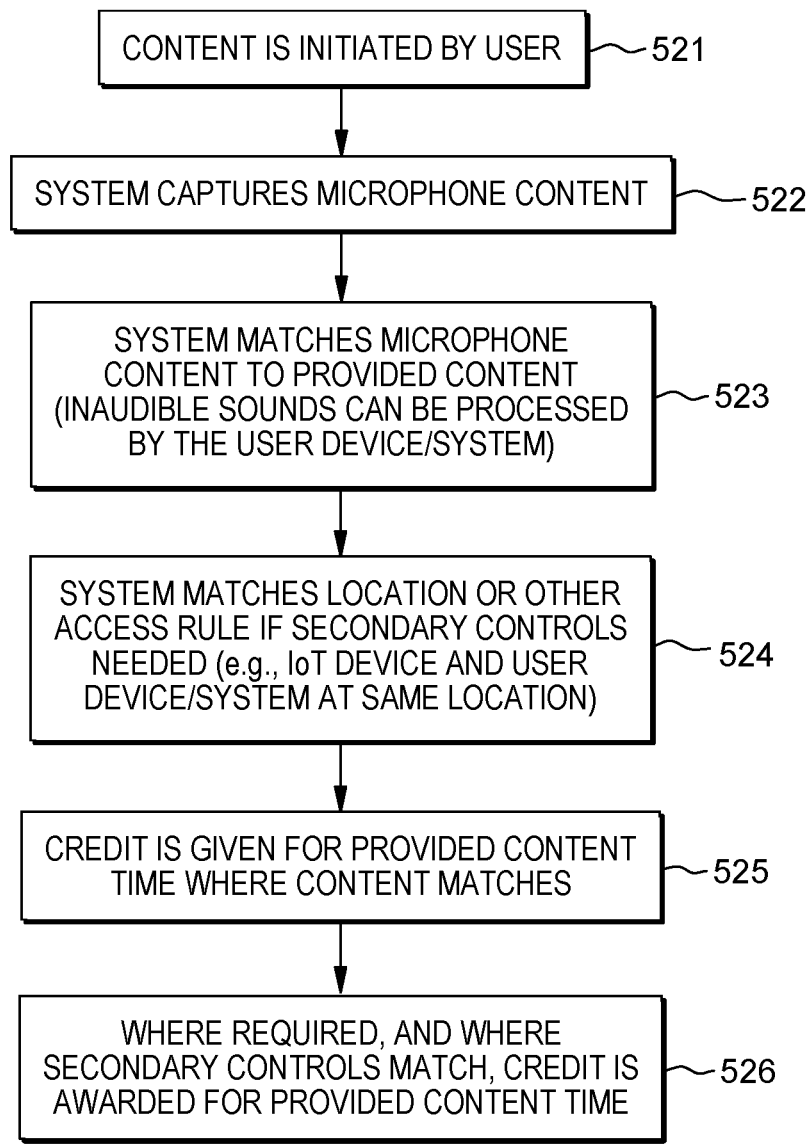

As illustrated in FIG. 5A, the workflow validates the content to user-linkage throughout the content presentation 520. One embodiment of this process is depicted in FIG. 5D. As illustrated, content is initiated by the user 521, and the system captures microphone content 522. The system matches microphone content to the provided content (i.e., inaudible sounds that are processed by the user-device/system) 523, and where required, matches the location or other access rule if secondary controls are required by the content (e.g., IoT device and user-device at same location) 524. Where validation is confirmed, credit is awarded for the provided content time, that is, where the inaudible audio content matches 525. Where required, and where secondary controls match, credit can be awarded for the provided content time based on the further secondary controls matching 526.

Figure 5E:
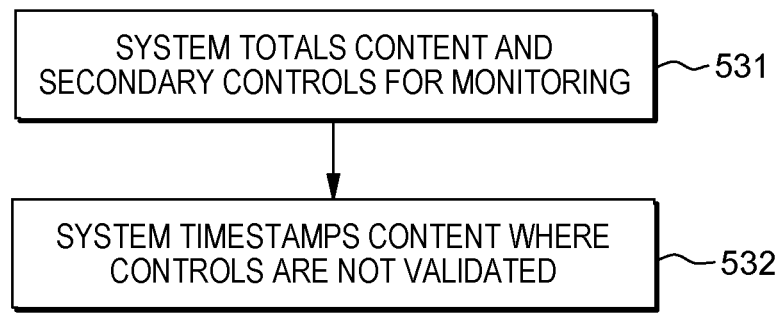

As illustrated in FIG. 5A, the workflow process determines whether the content presentation to the user has reached, in one embodiment, an appropriate threshold 530. As illustrated in FIG. 5E, the system, in one embodiment, totals the content and secondary controls to be monitored 531. Where the controls are not validated throughout the provided content, the system can timestamp content where controls are either validated or not validated 532, depending on the implementation.

Figure 5F:
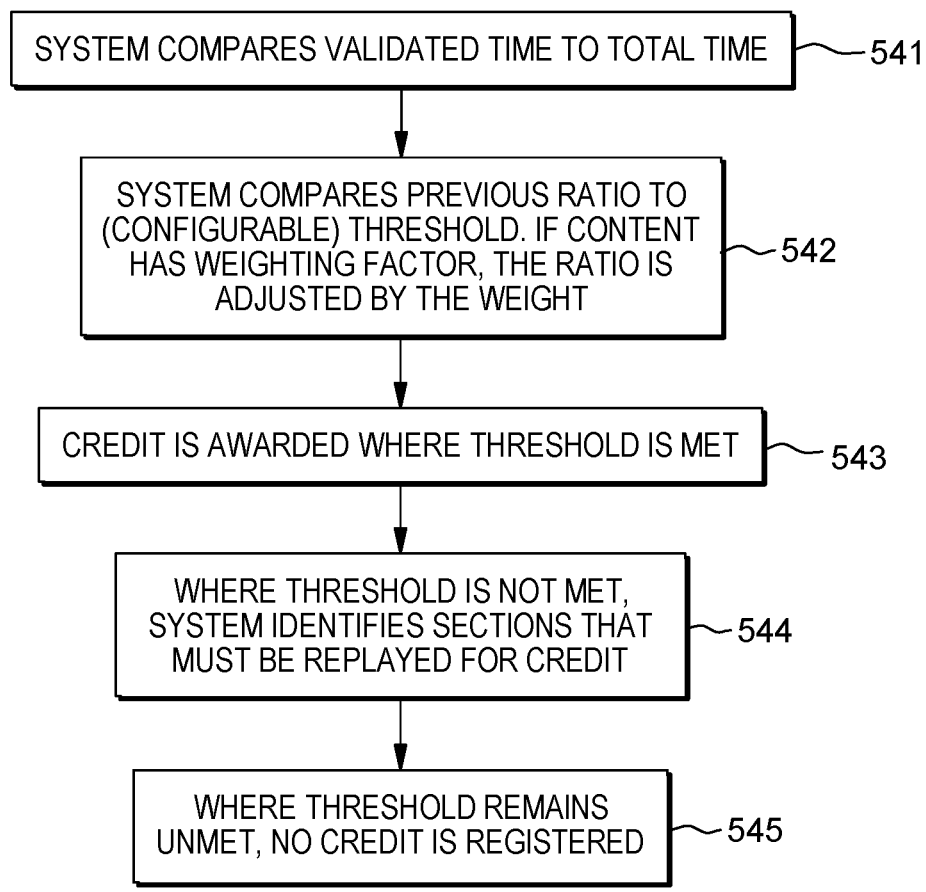

In the embodiment of FIG. 5A, a data-analysis recommendation is sent to the content provider to, for instance, award or deny credit 540. One embodiment of such a process is depicted in FIG. 5F, where the system compares validated time to total time of the content presentation 541 and compares the previous ratio to a configurable threshold 542. If the content has a weighting factor assigned, then the ratio is adjusted by the weighting factor. Credit is awarded where the specified threshold is met 543. Otherwise, where the threshold is not met, the system can identify, in one embodiment, sections of the provided content that must be replayed for credit 544. Where the threshold remains unmet, no credit is registered 545.

One embodiment of a computing environment to incorporate and use one or more aspects of the present invention is described with reference to FIG. 6. As an example, the computing environment is based on the IBM® z/Architecture® instruction set architecture, offered by International Business Machines Corporation, Armonk, N.Y. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 6, a computing environment 600 includes, for instance, a computer system 602 shown, e.g., in the form of a general-purpose computing device. Computer system 602 can include, but is not limited to, one or more general-purpose processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections. For instance, processors 604 and memory 606 are coupled to I/O interfaces 608 via one or more buses 610, and processors 604 are coupled to one another via one or more buses 611.

Bus 611 is, for instance, a memory or cache coherence bus, and bus 610 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special-purpose processors (e.g., neural network processors) (not shown) can also be provided separate from but coupled to the one or more general-purpose processors and/or can be embedded within the one or more general-purpose processors. Many variations are possible.

Memory 606 can include, for instance, a cache 612, such as a shared cache, which may be coupled to local caches 614 of processors 604 and/or to neural network processor, via, e.g., one or more buses 611. Further, memory 606 can include one or more programs or applications 616 and at least one operating system 618. An example operating system includes on IBM® z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 606 can also include one or more computer readable program instructions 620, which can be configured to carry out functions of embodiments of aspects of the present invention.

Moreover, in one or more embodiments, memory 606 can include processor firmware (not shown). Processor firmware can include, e.g., the microcode or millicode of a processor. It can include, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 602 can communicate via, e.g., I/O interfaces 608 with one or more external devices 630, such as a user terminal, a tape drive, a pointing device, a display, a microphone, and one or more data storage devices 634, etc. A data storage device 634 can store one or more programs 636, one or more computer readable program instructions 638, and/or data, etc. The computer readable program instructions may be configured to carry out functions of embodiments of aspects of the invention.

Computer system 602 can also communicate via, e.g., I/O interfaces 608 with network interface 632, which enables computer system 602 to communicate with one or more networks, such as a local area network (LAN), a general wide area network (WAN), and/or a public network (e.g., the Internet), providing communication with other computing devices or systems.

Computer system 602 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode or millicode, device drivers, redundant processing units, external disk drive arrays, RAID systems, tape drives, and data archival storage systems, etc.

Computer system 602 can be operational with numerous other general-purpose or special-purpose computing system environments or configurations. Examples of well-known computing systems, environments, and/or configurations that are suitable for use with computer system 602 include, but are not limited to, personal computer (PC) systems, mobile devices, handheld or laptop devices, server computer systems, thin clients, thick clients, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor (e.g., processor 604) includes a plurality of functional components (or a subset thereof) used to execute instructions. These functional components can include, for instance, an instruction fetch component to fetch instructions to be executed; an instruction decode unit to decode the fetched instructions and to obtain operands of the decoded instructions; one or more instruction execute components to execute the decoded instructions; a memory access component to access memory for instruction execution, if necessary; and a write back component to provide the results of the executed instructions. One or more of the components can access and/or use one or more registers in instruction processing. Further, one or more of the components may (in one embodiment) include at least a portion of or have access to one or more other components used in performing neural network processing (or other processing that can use one or more aspects of the present invention), as described herein.

The one or more other components can include, for instance, a neural network processing assist component (and/or one or more other components).

Other variations and embodiments are possible.

Figure 7A:
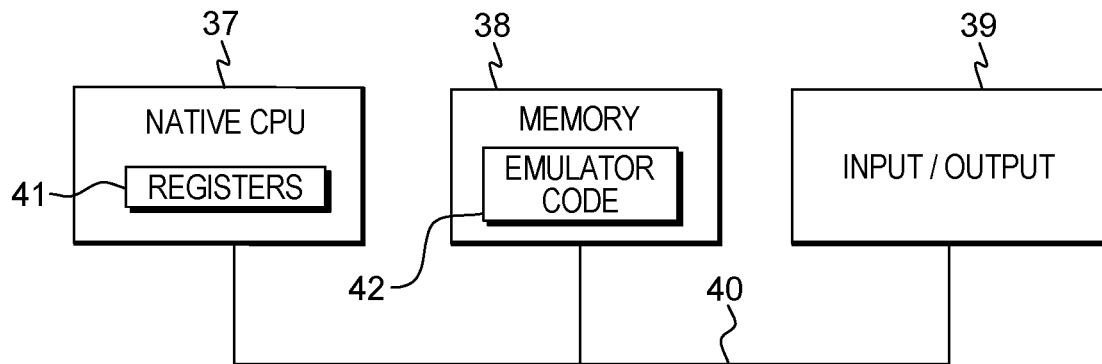
FIG. 7A depicts yet another example of a computing environment to incorporate and use one or more aspects of the present invention.

Another embodiment of a computing environment to incorporate and use one or more aspects of the present invention is described with reference to FIG. 7A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a Power® processor offered by International Business Machines Corporation, Armonk, N.Y.; an HP Superdome with Intel® processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 7B:
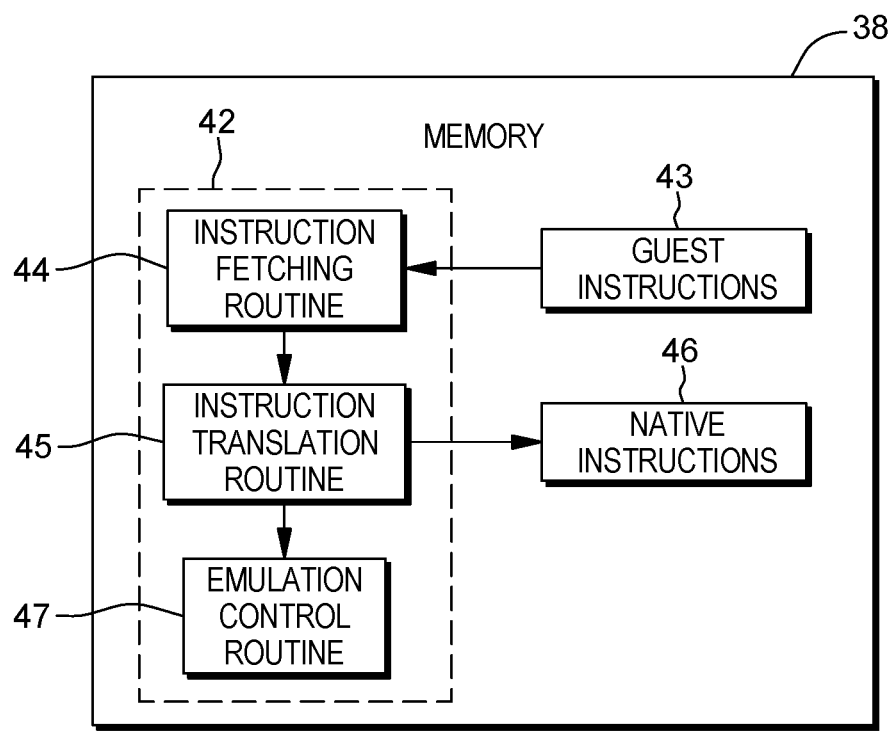
FIG. 7B depicts further details of the memory of FIG. 7A, in accordance with one or more aspects of the present invention.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
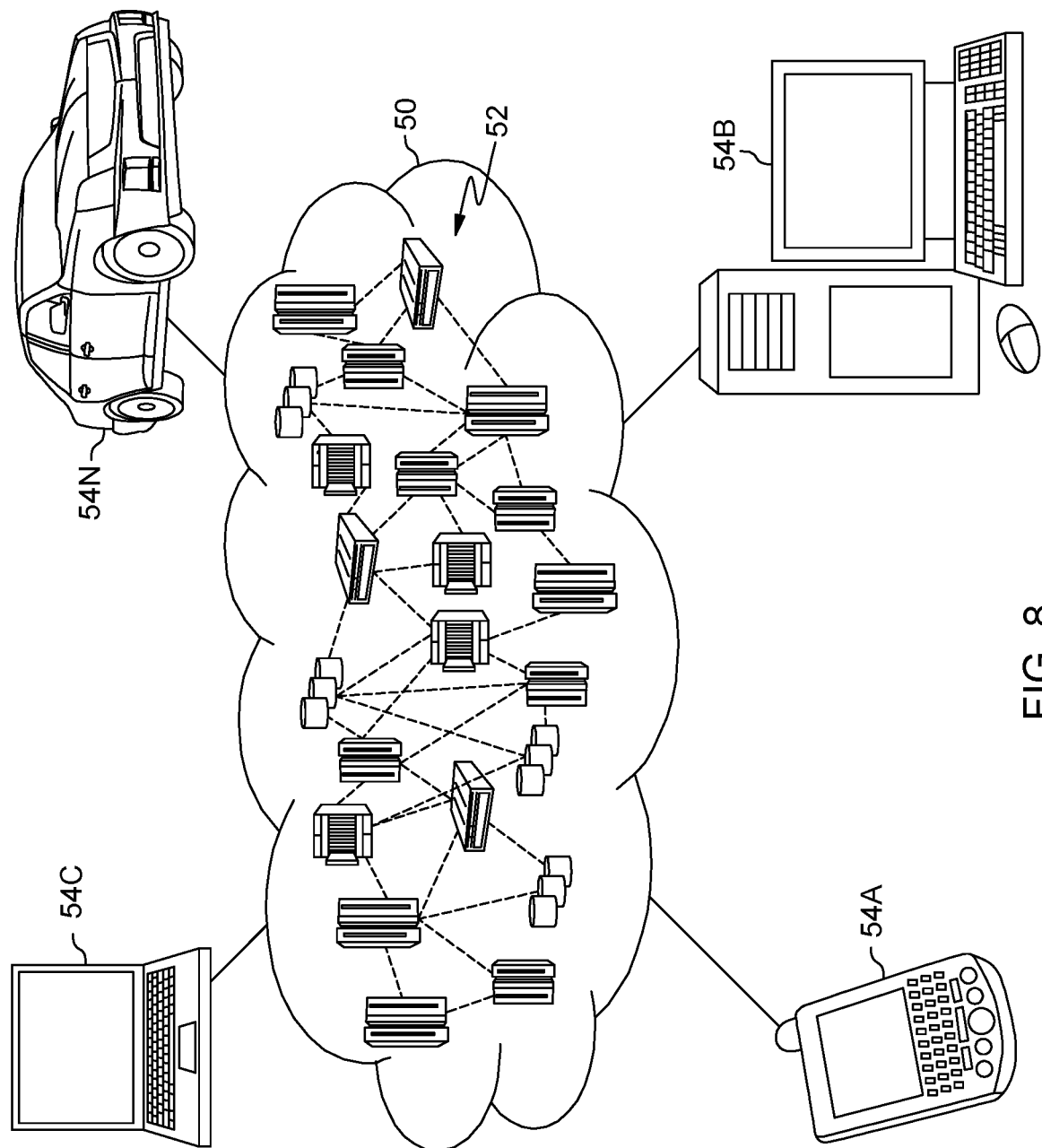
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 9:
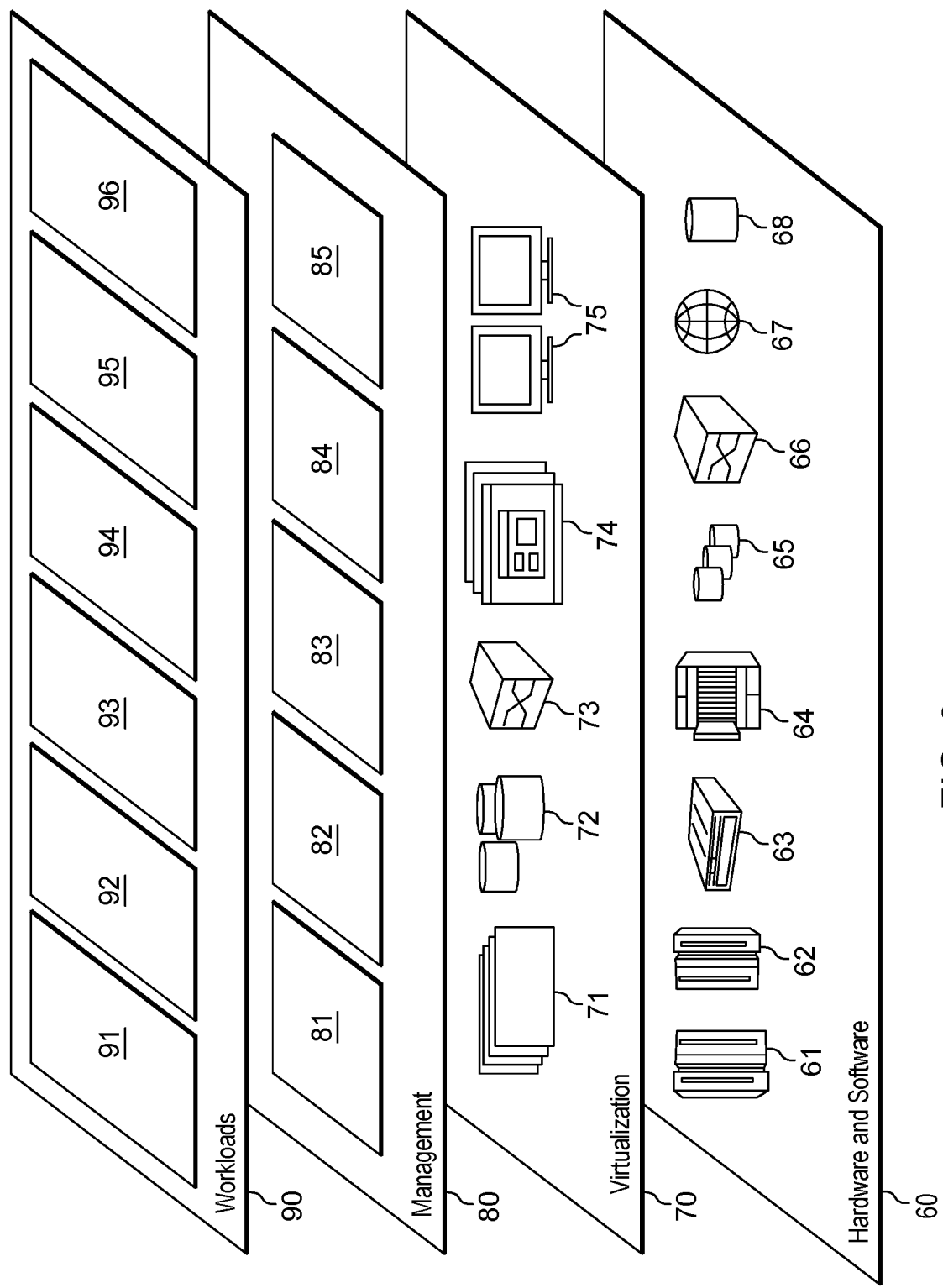
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; audio content validation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used.

Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating validation of audio content delivery, the computer program product comprising:

one or more computer-readable storage media having program instructions embodied therewith, the program instructions being readable by a processing circuit to cause the processing circuit to perform a method comprising:

obtaining an indication of detection of an inaudible sound signal embedded in an audio output of provided content initiated by a user on a user-device, the inaudible sound signal being inaudible to the user, and the audio output being from the user-device;

based on obtaining the indication of detection of the inaudible sound signal embedded in the audio output, validating that the audio output of the provided content is ON with respect to the user-device;

obtaining microphone audio data representative of the audio output of provided content on the user-device, and the validating comprises comparing the microphone audio data to the provided content to verify that the inaudible sound signals embedded therein match, wherein the inaudible sound signals matching is indicative that the audio output of the provided content is ON with respect to the user-device; and wherein based on the embedded inaudible sound signals not matching during the comparing of the microphone audio data and the provided content, the method further comprises identifying one or more portions of the provided content where the audio output of the provided content was unable to be heard through the user-device.

2. The computer program product of claim 1, wherein the validating is by a validation system, and the method further comprises linking the validation system to a content provider system supplying the provided content to the user-device, and providing, by the validation system, analysis data to the content provider system resulting from the comparing of the microphone audio data to the provided content.

3. The computer program product of claim 1, further comprising initiating, based on the identifying of the one or more portions, modifying of the provided content to obtain modified content for providing to the user-device.

4. The computer program product of claim 3, wherein the modified content includes the one or more portions of the provided content where the audio output of the provided content was unable to be heard through the user-device.

5. The computer program product of claim 1, further comprising determining whether the detected inaudible sound signal embedded in the audio output has reached a specified threshold, wherein the validating is further based on the inaudible sound signal embedded in the audio output of the provided content reaching the specified threshold.

6. The computer program product of claim 1, wherein the validating is by a validation system, and the method further comprises obtaining an indication of registration of the user-device with the validation system, wherein the user-device includes a microphone for detecting the inaudible sound signal embedded in the audio output of the provided content when the audio output is ON with respect to the user-device.

7. The computer program product of claim 1, wherein the validating is by a validation system, and the method further comprises obtaining an indication of registration of another user-associated device with the validation system, wherein the other user-associated device includes a microphone for detecting the inaudible sound signal embedded in the audio output of the provided content when the audio output is ON with respect to the user-device.

8. A computer system for facilitating validation of audio content delivery, the computer system comprising:
  a memory; and
  a processing circuit in communication with the memory, wherein the computer system is configured to perform a method, the method comprising:
    obtaining an indication of detection of an inaudible sound signal embedded in an audio output of provided content initiated by a user on a user-device, the inaudible sound signal being inaudible to the user, and the audio output being from the user-device;
    based on obtaining the indication of detection of the inaudible sound signal embedded in the audio output, validating that the audio output of the provided content is ON with respect to the user-device;
    obtaining microphone audio data representative of the audio output of provided content on the user-device, and the validating comprises comparing the microphone audio data to the provided content to verify that the inaudible sound signals embedded therein match, wherein the inaudible sound signals matching is indicative that the audio output of the provided content is ON with respect to the user-device; and
    wherein based on the embedded inaudible sound signals not matching during the comparing of the microphone audio data and the provided content, the method further comprises identifying one or more portions of the provided content where the audio output of the provided content was unable to be heard through the user-device.

9. The computer system of claim 8, wherein the validating is by a validation system, and the method further comprises linking the validation system to a content provider system supplying the provided content to the user-device, and providing, by the validation system, analysis data to the content provider system resulting from the comparing of the microphone audio data to the provided content.

10. The computer system of claim 8, further comprising initiating, based on the identifying of the one or more portions, modifying of the provided content to obtain modified content for providing to the user-device.

11. The computer system of claim 10, wherein the modified content including the one or more portions of the provided content where the audio output of the provided content was unable to be heard through the user-device.

12. The computer system of claim 8, further comprising determining whether the detected inaudible sound signal embedded in the audio output has reached a specified threshold, wherein the validating is further based on the inaudible sound signal embedded in the audio output of the provided content reaching the specified threshold.

13. A computer-implemented method of facilitating validation of audio content delivery, the computer-implemented method comprising:
  obtaining an indication of detection of an inaudible sound signal embedded in an audio output of provided content initiated by a user on a user-device, the inaudible sound signal being inaudible to the user, and the audio output being from the user-device;
  based on obtaining the indication of detection of the inaudible sound signal embedded in the audio output, validating that the audio output of the provided content is ON with respect to the user-device;
  further comprising obtaining microphone audio data representative of the audio output of provided content on the user-device, and the validating comprises comparing the microphone audio data to the provided content to verify that the inaudible sound signals embedded therein match, wherein the inaudible sound signals matching is indicative that the audio output of the provided content is ON with respect to the user-device; and
  wherein based on the embedded inaudible sound signals not matching during the comparing of the microphone audio data and the provided content, the computer-implemented method further comprises:
    identifying one or more portions of the provided content where the audio output of the provided content was unable to be heard the user-device; and
    initiating, based on the identifying of the one or more portions, modifying of the provided content to obtain modified content for providing to the user-device.

14. The computer-implemented method of claim 13, wherein the validating is by a validation system, and the method further comprises linking the validation system to a content provider system supplying the provided content to the user-device, and providing, by the validation system, analysis data to the content provider system resulting from the comparing of the microphone audio data to the provided content.

* * * * *